United States Patent [19]

Swiecicki

[11] 4,003,674
[45] Jan. 18, 1977

[54] HYDRAULIC TURBINE DRAFT TUBE PRESSURE STABILIZER

[75] Inventor: Ignacy Swiecicki, York, Pa.

[73] Assignee: Allis-Chalmers Corporation, Milwaukee, Wis.

[22] Filed: May 5, 1975

[21] Appl. No.: 574,527

Related U.S. Application Data

[63] Continuation of Ser. No. 423,544, Dec. 10, 1973, abandoned.

[52] U.S. Cl. .................. 415/116; 60/696; 415/119
[51] Int. Cl.² .................. F01D 25/30; F01D 5/10
[58] Field of Search ............ 415/116, 119; 60/686, 60/689, 696

[56] References Cited

UNITED STATES PATENTS

| | | | |
|---|---|---|---|
| 1,791,585 | 2/1931 | Terry | 60/686 |
| 1,848,738 | 3/1932 | Moody | 60/686 |
| 2,182,974 | 12/1939 | Terry | 60/696 |
| 2,300,748 | 11/1942 | Rheingans | 60/696 |
| 3,398,932 | 8/1968 | Koeller et al. | 415/119 |

FOREIGN PATENTS OR APPLICATIONS 279,351   2/1914   Germany

*Primary Examiner*—Carlton R. Croyle
*Assistant Examiner*—L. T. Casaregola
*Attorney, Agent, or Firm*—John P. Hines

[57] ABSTRACT

A hydraulic turbine having means for admitting air to the turbine draft tube. An annular air chamber about the draft tube has a plurality of circumferentially spaced openings into the interior of the draft tube. The pressure of the air in the air chamber is maintained below the maximum pressure of the water in the draft tube and above the minimum pressure of the water in the draft tube. This results in air entering the draft tube only at the areas of lowest water pressure and water entering the air chamber at areas of highest water pressure.

2 Claims, 1 Drawing Figure

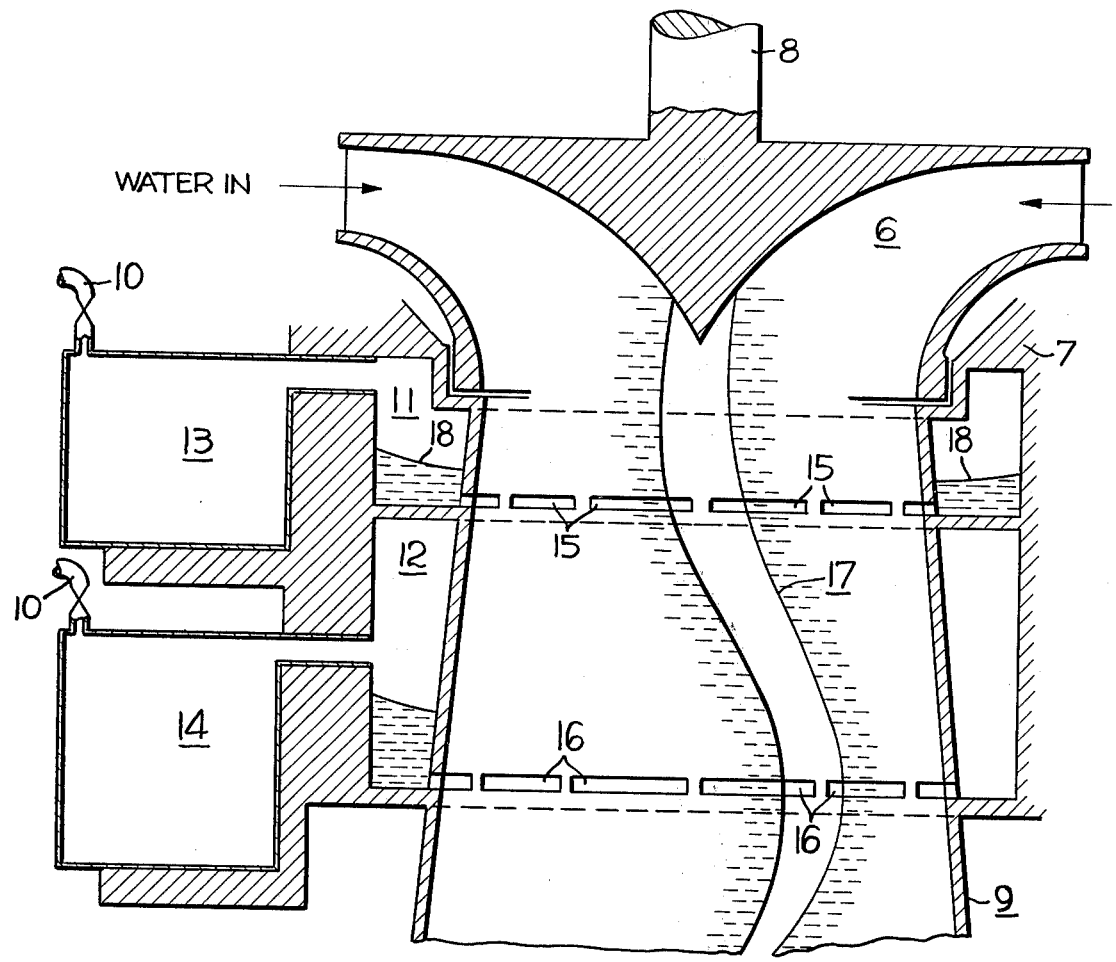

HYDRAULIC TURBINE DRAFT TUBE PRESSURE STABILIZER

This is a continuation of application Ser. No. 423,544 filed Dec. 10, 1973, abandoned.

This invention pertains in general to hydraulic turbines and more particularly to means for supplying air to the low pressure areas of the turbine draft tube.

BACKGROUND OF THE INVENTION

At times it is necessary to operate hydraulic turbines outside the range of conditions for which the turbine was designed. This is commonly referred to as "off peak operation." Off peak operation causes power swings in the system and can result in damaging vibration to the machine.

These power swings are attributable to or at least related to pressure surges in the draft tube. It is generally felt that the pressure surges are due to a rotating vortex at the runner exit into the draft tube which is mainly a function of the angular momentum of the water leaving the runner. The vortex is in effect a low pressure area in the draft tube.

It is known that the spiral-shaped vortex rotates at approximately one-third of the runner speed. When this takes place the pressure distribution at most horizontal cross sections of the draft tube is not uniform. At the point of cross sectional circumference of the draft tube to which the core of the vortex is closest the pressure is the lowest. Conversely, the point of cross sectional circumference of the draft tube farthest from the core of the vortex experiences the highest pressure. These uneven pressures at the draft tube wall supply resultant forces perpendicular to the vortex which causes the vortex to rotate.

In the past it has been found beneficial to inject air at various locations in the turbine including the draft tube. It was hoped that the air would mix sufficiently with the water to create a constant pressure in the draft tube thereby dissipating the pressure surges. Examples of such prior art structure are disclosed in U.S. Pat. No. 1,848,738 issued to L. F. Moody on Mar. 8, 1932 and German Pat. No. 279,351 having a data of Feb. 7, 1914.

In some instances the prior art method of uniformly injecting air into the draft tube did produce improved results. However, in many other cases it did not. Furthermore, in many cases the cost of the equipment to supply the necessary amount of air was greater than the savings resulting from dissipating the pressure surges.

OBJECTS OF THE INVENTION

It is the intention and general object of this invention to provide a system for supplying air to the draft tube of a hydraulic turbine which overcomes the shortcomings of such prior art systems.

An additional object is to provide a system for selectively delivering air to the draft tube of a hydraulic turbine at the point of minimum pressure.

A further object of the subject invention is to provide a system of the hereinbefore described type wherein an air chamber located about the hydraulic turbine draft tube includes air at a pressure intermediate the maximum and minimum pressures in the draft tube.

A more specific object of the subject invention is to provide a system of the hereinbefore described type wherein air enters the draft tube from the air chamber at the low pressure points and water from the draft tube enters the air chamber at the high pressure points.

These and other objects of the subject invention will become more fully apparent as the following description is read in light of the attached drawing which shows a hydraulic turbine in cross section constructed in accordance with the subject invention.

DESCRIPTION OF THE INVENTION

Referring to the attached drawing, the invention is disclosed in connection with a vertically disposed hydraulic turbine of the Francis type. The turbine runner 6 is supported for rotation within the turbine casing 7 by means of a shaft 8 which is supported on conventional thrust bearings (not shown). The turbine draft tube generally designated 9 directs the water from the runner 6 to the hydraulic installation tail race (not shown).

One or more annular air chambers 11 and 12 may be provided about the draft tube 9. Each air chamber 11 and 12 may be separately connected respectively to an air tank 13 and 14. Each air tank is supplied with air at a predetermined pressure by means of the delivery pipes 10. The pressure in the air tanks 13 and 14 is maintained by a source of pressurized air such as an air compressor (not shown). A plurality of circumferentially spaced openings 15 and 16 connect the air chambers 11 and 12 respectively with the interior of the draft tube 9.

In well known fashion water entering a Francis type hydraulic turbine enters through a scroll case (not shown) which imparts a rotating motion to the water as it enters the turbine runner 6 to impart rotation to the runner. As the water leaves the turbine runner it is still rotating and creates a low pressure vortex generally designated 17. This low pressure vortex also rotates about the draft tube at a speed substantially equal to one-third the speed of rotation of the runner. Since the vortex itself is at a low pressure, the area of the draft tube immediately adjacent the vortex is also at a lower pressure than the area of the draft tube remote from the vortex. Therefore, the turbine draft tube 9 is exposed to high and low pressure areas which are located in dependence on the location of the vortex 17. In this invention the air in the chambers 11 and 12 is maintained at a pressure intermediate these high and low pressure areas in the draft tube.

In relation to the air chamber 11, the vortex 17 is located at the center of the draft tube. Therefore, the pressure at this horizontal location in the periphery of the draft tube is equal. In this particular embodiment the air pressure in the chamber 11 is slightly less than the intermediate pressure of the water, and, therefore, the water flows into the chamber 11 as indicated at 18. The water seeks a level whereby the head of the water in the chamber 11 added to the pressure of the air in the chamber equalizes the pressure of the water in the draft tube. In this particular instance, since the pressure around the vortex is uniform the level of water in the chamber 11 is uniform, and no air enters the draft tube.

Referring now to the situation in connection with the air chamber 12, it is noted that the low pressure vortex 17 is closely adjacent the right side of the draft tube. Therefore, the right side of the draft tube is at a lower pressure than the air pressure in the chamber 12, and air freely flows into the draft tube through the openings 16 equalizing the pressure therein. On the left side of the draft tube the water pressure is at a maximum and it causes water to flow into the air chamber 12 and seek a level higher than the water in chamber 11. Water flows into chamber 12 until it has reached a height so that the head of the water plus the pressure of the air in the chamber equalizes the pressure of the water on this side of the draft tube.

From the above it can be seen that as the vortex rotates the water within the turbine acts as a valve to admit and interrupt the flow of air into the draft tube. The air is selectively admitted only to those areas of low pressure where it is needed. In this way air is admitted in large quantity at the point of lowest pressure, and at the point of highest pressure some water from the draft tube enters the air chamber. This has the tendency to equalize pressures at the periphery of the draft tube and to overcome the force differential which tends to cause the vortex to rotate. By stopping rotation of the vortex, the pressure surges are minimized and the machine operates more efficiently. Furthermore, by utilizing the pressure differential of the water to selectively permit and interrupt the admission of air into the draft tube, only that amount of air that is absolutely required is utilized, thereby reducing the cost of the air supplying machinery.

The embodiments of the invention in which an exclusive property or privilege is claimed are defined as follows:

1. In a hydraulic turbine having a casing to permit the flow of water therethrough, a runner mounted for rotation within said casing and a draft tube connected to said casing downstream from said runner and having high and low water pressures therein, the improvement comprising:
   an air chamber positioned about said draft tube;
   a plurality of circumferentially spaced openings connecting the interior of said draft tube to said air chamber; and
   a source of pressurized air connected to said air chamber, means for maintaining the pressure of said air greater than the pressure of said water in the low pressure areas of said draft tube where the air enters said draft tube and less than the pressure of said water in the high pressure areas of said draft tube where the water enters said air chamber, said openings being located adjacent the lower end of said chamber whereby the vertical space above said openings in said chamber is sufficient to permit the draft tube water to rise therein until the sum of the air pressure and the pressure of the water head in said chamber is equal to the high pressure water in said draft tube.

2. A hydraulic turbine set forth in claim 1 wherein the pressure of said air is less than medium pressure of said water.

* * * * *